(12) United States Patent
Labbé

(10) Patent No.: US 6,997,833 B2
(45) Date of Patent: Feb. 14, 2006

(54) DOUBLE-SIDED SLIDING BUTTON FOR USE IN A CONTINUOUSLY VARIABLE TRANSMISSION

(75) Inventor: Jocelyn Labbé, St-Germain-de-Grantham (CA)

(73) Assignee: CVTech R&D Inc., Quebec (CA)

( * ) Notice: Subject to any disclaimer, the term of this patent is extended or adjusted under 35 U.S.C. 154(b) by 48 days.

(21) Appl. No.: 10/390,097

(22) Filed: Mar. 17, 2003

(65) Prior Publication Data

US 2004/0185980 A1    Sep. 23, 2004

(51) Int. Cl.
F16H 59/00    (2006.01)
F16H 63/00    (2006.01)

(52) U.S. Cl. .............................. 474/19; 474/12; 474/17
(58) Field of Classification Search ........ 474/201–202, 474/242–245, 230–231, 11–13, 17, 21, 19, 474/25, 10, 8
See application file for complete search history.

(56) References Cited

U.S. PATENT DOCUMENTS

| | | | | |
|---|---|---|---|---|
| 40,910 | A | * | 12/1863 | Clissold ...................... 474/245 |
| 921,095 | A | * | 5/1909 | Dukelow .................... 474/242 |
| 1,096,851 | A | * | 5/1914 | McClatchey ................ 474/245 |
| 1,236,964 | A | * | 8/1917 | Mesinger .................... 474/245 |
| 1,424,767 | A | * | 8/1922 | Mesinger .................... 474/245 |
| 1,476,603 | A | * | 12/1923 | Firminger ................... 474/245 |
| 2,170,925 | A | * | 8/1939 | Kellenberger .............. 474/244 |
| 4,378,221 | A | | 3/1983 | Huff et al. |
| 4,798,567 | A | * | 1/1989 | Hoshiro et al. ............. 474/242 |
| 5,052,985 | A | * | 10/1991 | Masuda et al. ............. 474/245 |
| 5,403,240 | A | | 4/1995 | Smith et al. |
| 6,413,178 | B1 | | 7/2002 | Chamberland |

FOREIGN PATENT DOCUMENTS

| | | | | |
|---|---|---|---|---|
| DE | (3445867 A1 | * | 6/1986 | ................. 474/242 |
| FR | 2658892 | | 8/1991 | |
| JP | (57-12147 A | * | 1/1982 | ................. 474/245 |
| JP | (58-211051 A | * | 12/1983 | ................. 474/245 |
| JP | (64-65349 A | * | 3/1989 | ................. 474/242 |
| JP | (03-96736 A | * | 4/1991 | ................. 474/245 |
| JP | (04-54349 A | * | 2/1992 | ................. 474/245 |
| JP | (05-33832 A | * | 2/1993 | ................. 474/245 |

OTHER PUBLICATIONS

EPO, International Search Report, Jul. 8, 2004.

* cited by examiner

Primary Examiner—Marcus Charles
(74) Attorney, Agent, or Firm—Devine, Millimet & Branch, PA; Paul C. Remus; Michelle Saquet Temple

(57) ABSTRACT

The double-sided sliding button comprises two spaced-apart sliding button halves configured and disposed with reference to a curved medial axis. Each half has a front side, provided with a contact surface, and a rear side. Both contact surfaces are mutually opposite and both sides of each half intersect the curved medial axis. A bridge member allows to rigidly connect the rear side of the two halves. With this configuration, each sliding button can be easily installed and secured in a clamp attached to a part of the driven pulley. Each double-sided sliding button is capable of working in both directions, thereby reducing the number of individual sliding buttons to be installed by 50%.

6 Claims, 7 Drawing Sheets

DOUBLE-SIDED SLIDING BUTTON FOR USE IN A CONTINUOUSLY VARIABLE TRANSMISSION

BACKGROUND

Continuously variable transmissions (CVTs) are commonly used on a wide range of vehicles, such as small cars or trucks, snowmobiles, golf carts, scooters, etc. They typically comprise a driving pulley mechanically connected to a motor, a driven pulley mechanically connected to wheels or a track, possibly through another mechanical device such as a gear box, and a trapezoidal drivebelt transmitting torque between the driving pulley and the driven pulley. A CVT automatically changes the ratio as required by load and speed conditions, providing an increased torque under high loads at low speeds and yet controlling the rotation speed of the motor as the vehicle accelerates. A CVT may be used with all kinds of motors, such as internal combustion engines or electric motors.

The sides of the drivebelt are, on each pulley, gripped between two opposite sheaves that are coaxially mounted around a corresponding main shaft. Generally, in each pulley of a conventional CVT, one sheave, usually called "fixed sheave", is rigidly connected to one end of the corresponding main shaft. The other sheave, usually called "movable sheave", is free to slide and/or rotate with reference to the fixed sheave since it is mounted on bushings or the like.

At a low vehicle speed, the winding diameter of the drivebelt at the driving pulley is minimal and the winding diameter at the driven pulley is maximum. This is referred to as the minimum ratio since there is the minimum number of rotations or fraction of rotation of the driven pulley for each full rotation of the driving pulley.

Generally, when the rotation speed of the driving pulley increases, its movable sheave moves closer to the fixed sheave thereof under the effect of a centrifugal mechanism. This forces the drivebelt to wind on a larger diameter on the driving pulley and, consequently, on a smaller diameter on the driven pulley. The drivebelt then exerts a radial force on the sheaves of the driven pulley in addition to the tangential driving force by which the torque is transmitted. This radial force urges the movable sheave of the driven pulley away from the fixed sheave thereof. It is counterbalanced in part by a return force, which is typically generated by a spring inside the driven pulley or another biasing mechanism. It is also counterbalanced by a force generated by the axial reaction of the torque applied by the drivebelt on the driven pulley. This is caused by a cam system that tends to move the movable sheave towards the fixed sheave as the torque increases. The cam system typically comprises a cam plate having a plurality of symmetrically-disposed and inclined ramps on which respective cam followers are engaged. The followers are usually sliding buttons or rollers. The set of ramps or the set of followers is mounted on the movable sheave and the other is directly or indirectly connected to the main shaft in a rigid manner. The closing effect of the cam system on the drivebelt tension is then somewhat proportional to output torque.

Generally, at the maximum vehicle speed, the ratio is maximum as there is the maximum number of rotations or fraction of rotation of the driven pulley for each full rotation of the driving pulley. Then, when the vehicle speed decreases, the rotation speed of the driving pulley typically decreases as well since the rotation speed of the motor decreases. This causes, at some point, a decrease of the winding diameter of the driving pulley and a decrease of the radial force exerted by the drivebelt on the sides of the sheaves at the driven pulley. Ultimately, the driven pulley is allowed to have a larger winding diameter as the spring or another biasing mechanism moves the movable sheave towards the fixed sheave.

Some CVTs are provided with reversible driven pulleys. A reversible driven pulley operates in a similar fashion than that of a unidirectional one, with the exception that the transmission ratio can be controlled during motor braking or when the vehicle is traveling in reverse. For instance, during motor braking, the torque is no longer coming from the motor to the wheels or track, but in the opposite direction. Similarly, when accelerating in reverse, the torque and the rotation will be in the reverse direction, the torque being transmitted from the motor to the wheels or track. A reversible driven pulley generally comprises a second set of ramps and a second set of followers. In use, one set of followers and its corresponding set of ramps are used when the torque is in one direction, the other set being used for the other direction.

As can be seen from the foregoing, reversible driven pulleys must have two sets of followers, one being required for each set of ramps. Each of these followers must be secured at a corresponding location in the driven pulley. The attachment of the followers is particularly important since they are subjected to very important stresses when the driven pulleys are in operation. When the followers are sliding buttons, one must be able to easily remove them and replace them with new ones since they usually wear over time. There was thus a need to provide a sliding button having a new configuration and design which is more convenient and efficient than the conventional ones, particularly for reversible driven pulleys where the number of sliding buttons is important.

SUMMARY

An object of the present invention is to provide a double-sided sliding button for use in a reversible driven pulley. The sliding button comprises two spaced-apart sliding button halves which are configured and disposed with reference to a curved medial axis. Each half has a front side, provided with a contact surface, and a rear side. Both contact surfaces are mutually opposite and both sides of each half intersect the curved medial axis. A bridge member allows to rigidly connect the rear side of the two halves. With this configuration, each sliding button can be easily installed and secured in a clamp attached to a part of driven pulley. Each sliding button is also capable of working in both directions, thereby reducing the number of individual sliding buttons to install by 50%.

Other objects, aspects and advantages of the present invention are described in or apparent from the following detailed description of a preferred embodiment made in conjunction with the accompanying figures.

BRIEF DESCRIPTION OF THE FIGURES

Throughout the figures, analogous components are identified by the same reference numerals. Some parts which are not referred to correspond to the same components shown in preceding figures.

DESCRIPTION

Figure 1:
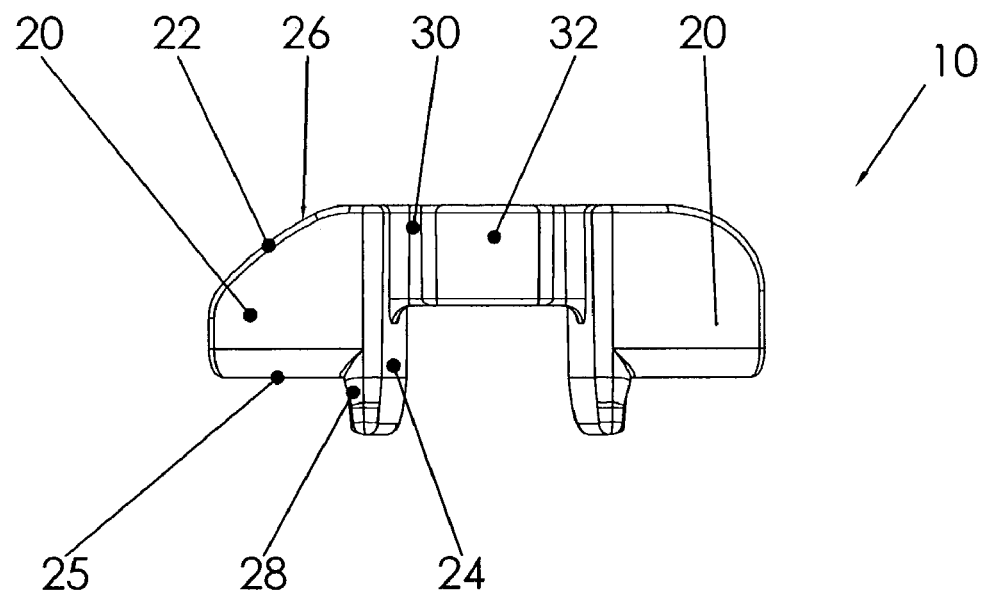
FIG. 1 is a side elevation view of the sliding button in accordance with a preferred embodiment of the present invention.

The following is a list of reference numerals, along with the names of the corresponding components, which are used in the description and in the accompanying figures.

- 10 Double-sided sliding button
- 20 Half (of the sliding button 10)
- 22 Front side (of each half 20)
- 24 Rear side (of each half 20)
- 25 Bottom side (of each half 20)
- 26 Contact surface (of each half 20)
- 28 Flange (of each half 20)
- 30 Bridge member
- 32 Sleeve portion (of the bridge member 30)
- 100 Clamp
- 110 Central section (of the clamp 100)
- 112 Flange (of the clamp 100)
- 114 Slot (of the clamp 100)
- 116 Threaded bore (in the central section 110)
- 120 Side sections (of the clamp 100)
- 130 Radial slots (of the clamp 100)
- 140 Screw
- 200 Ramps
- M Curved medial axis FIGS. 1 to 9 show a double-sided sliding button (10) in accordance with a preferred embodiment of the present invention. The double-sided sliding button (10) is shown with the preferred embodiment for a corresponding clamp (100) used to attach the sliding button (10). These parts are to be installed in a reversible driven pulley. Like the other components of a driven pulley, the sliding button (10) and the clamp (100) are configured and disposed to be symmetrical with reference to the rotation axis of the driven pulley. This also allows the driven pulley to remain balanced when rotating.

The sliding button (10) is constructed with reference to a curved medial axis (M). The center of the curved medial axis (M) is preferably the rotation axis of the driven pulley. The driven pulley has one sheave which is able to slide and rotate with reference to the other sheave. The sliding buttons (10) are then mounted on one of these sheaves. Corresponding ramps (200) are mounted on the other sheave. The ramps (200) are curved as well.

As can be seen, the sliding button (10) comprises two spaced-apart sliding button halves (20). Each half (20) is in fact a sliding button corresponding to one of the ramps (200). Both halves (20) are not necessarily identical since they are used in different contexts. For instance, when the vehicle travels in reverse, the response of the driven pulley do not need to be the same compared to when the vehicle travels in a forward direction. The shape of the ramps (200) of each set also changes as well.

Figure 2:
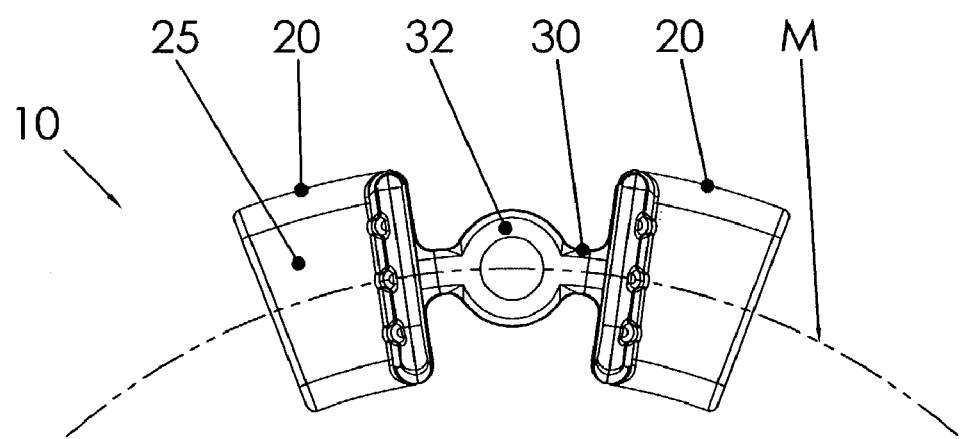
FIG. 2 is a bottom view of the sliding button shown in FIG. 1.
Figure 8:
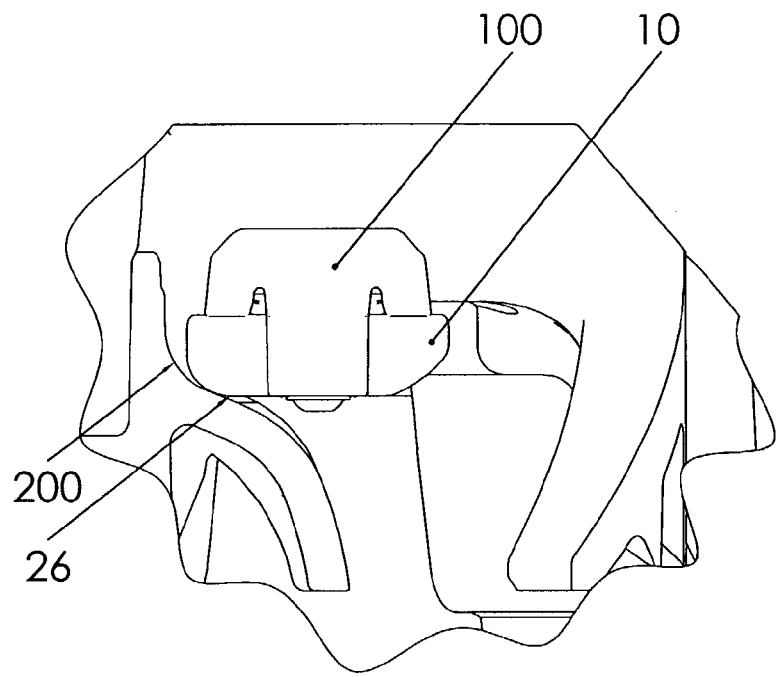
FIG. 8 is a schematic side view showing two opposite ramps and a double-sided sliding button.
Figure 9:
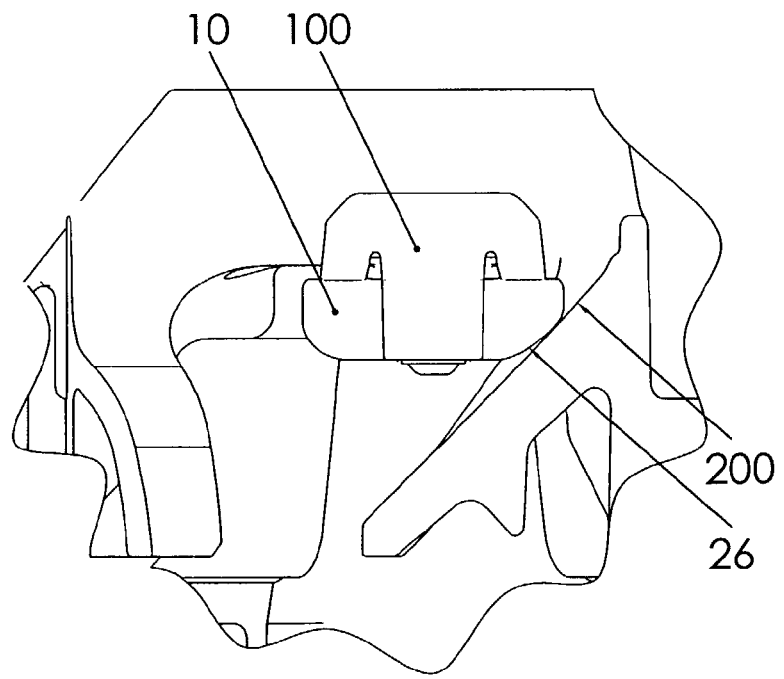
FIG. 9 is a view similar to FIG. 6, showing another position for the sliding button.

Each half (20) has a front side (22), a rear side (24) and a bottom side (25). The front side (22) is provided with a contact surface (26), which contact surface (26) is shaped in accordance with the design requirement and to maintain a good contact with the corresponding ramp (200). Examples of ramps (200) are shown in FIGS. 8 and 9. The contact surface (26) defines a three-dimensional curve, or helix, which is matched by an opposite curve on the surface of a corresponding ramp (200). As best shown in FIG. 2, both contact surfaces (26) of the sliding button (10) are mutually opposite and both front sides (22) intersect the curved medial axis (M).

A bridge member (30) is used to maintain together the two sliding button halves (20). This bridge member (30) is rigidly connected to the rear side (24) of the two sliding button halves (20). The bridge member (30) is preferably aligned with the curved medial axis (M), although it could also be located elsewhere, for instance closer to an edge of the sliding button halves (20). It also preferably comprises a sleeve portion (32) having a center axis extending substantially parallel to the rear side (24) of the sliding button halves (20).

Preferably, each half (20) further comprises a flange (28) projecting from the bottom side (25). These flanges (28) allow to tightly secure the sliding button (10) in place. Each flange (28) is adjacent to the rear side (24) of the corresponding half (20) and extend parallel thereto. The purpose of these flanges (28) will be explained hereafter.

Figure 3:
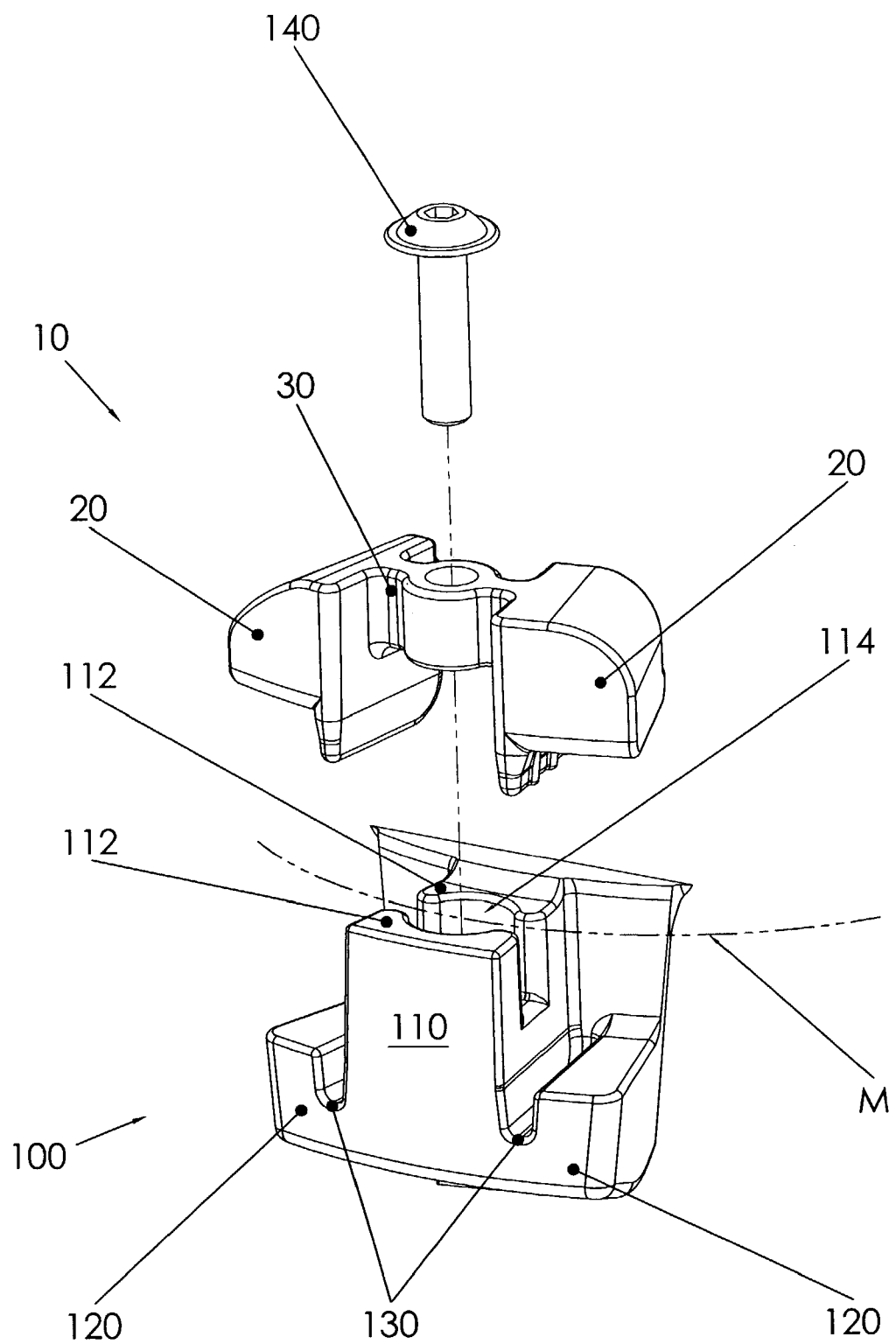
FIG. 3 is an exploded perspective view of the double-sided sliding button shown in FIG. 1 and a corresponding supporting clamp.

The clamp (100) used to hold the sliding button (10) is preferably T-shaped, as shown in FIG. 3. Other configurations can be used as well. The clamp (100) is generally curved and aligned with the curved medial axis (M). It comprises a central section (110) and two opposite side sections (120). The central section (110) and the side sections (120) are preferably separated by radial slots (130).

Figure 5:
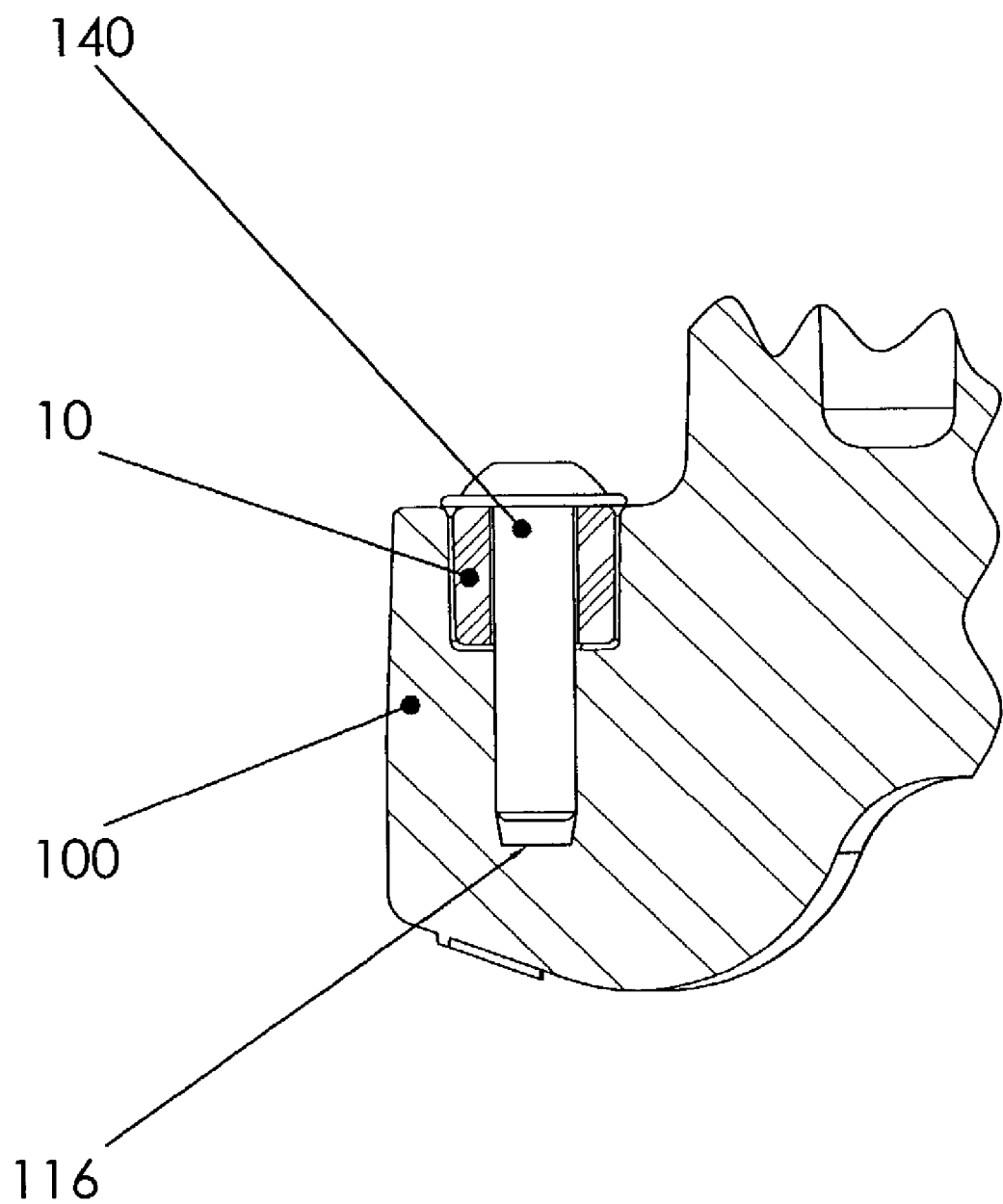
FIG. 5 is a cross-section view taken along line V—V in FIG. 4.

The central section (110) of each clamp (100) comprises opposite and spaced-apart flanges (112). The two flanges (112) define between them a slot (114) between which the bridge member (30) of the sliding button (10) will be inserted. Furthermore, as shown in FIG. 5, a threaded bore (116) is provided in the central section (110) in order to receive the free end of a screw (140) designed to secure the sliding button (10) in place. It should be noted that the screw (140) can be replaced by any other equivalent connector.

Figure 4:
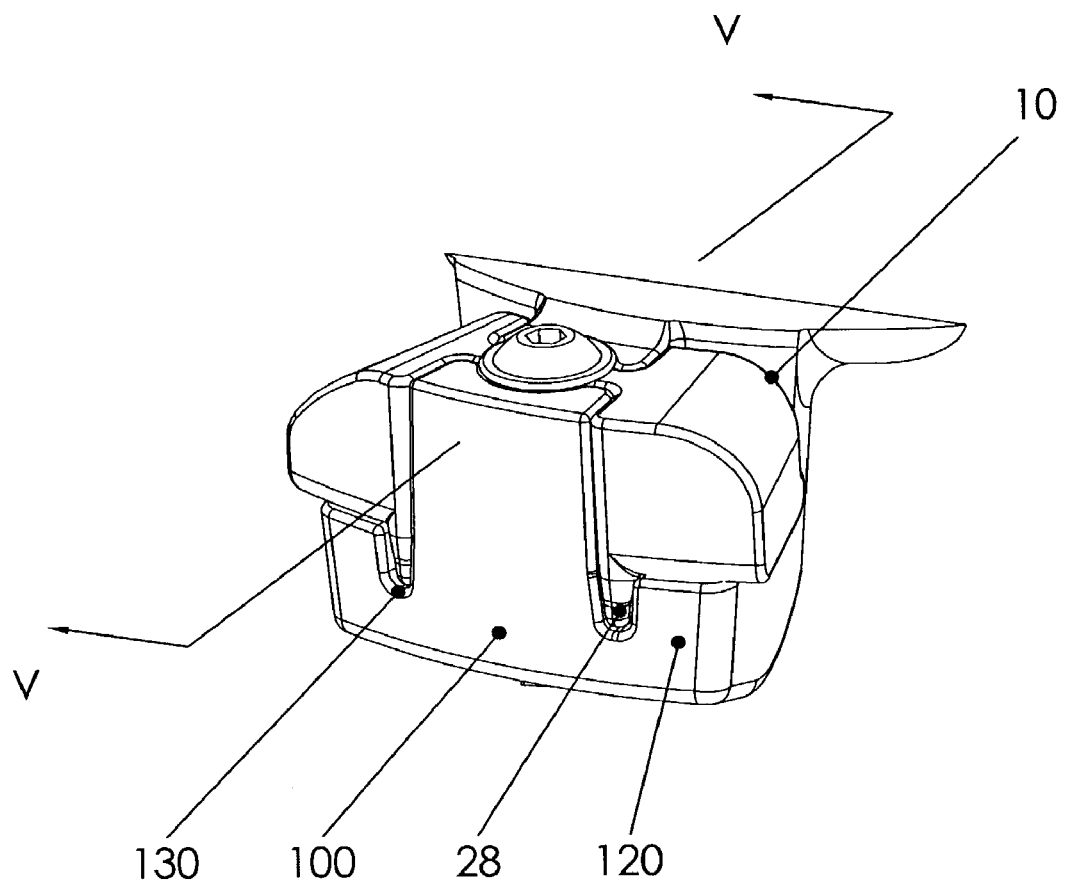
FIG. 4 is an perspective view of the resulting assembly of the sliding button and the clamp shown in FIG. 3.

The design of the parts is such that the sliding button (10) should fit snugly and tightly into the clamp (100), as shown in FIG. 4. This insures that the forces are properly balanced and that the sliding button (10) remains in place. The projecting flanges (28) of the sliding button (10) then extend into the radial slots (130) of the clamp (100) with an interfering engagement. The flanges (28) preferably comprise a plurality of bosses which allow to facilitate the insertion of the flanges (28) in their respective radial slot (130).

Figure 6:
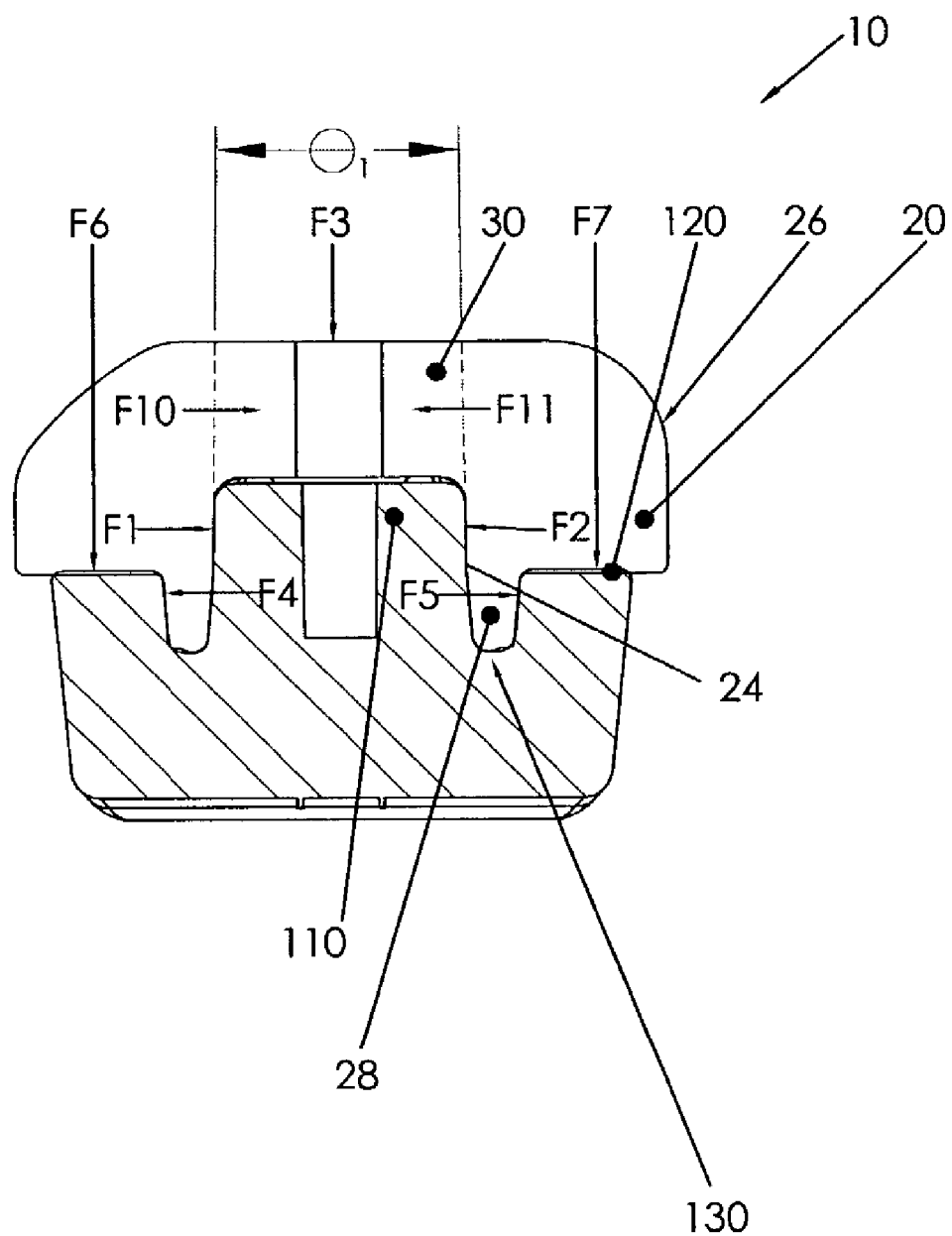
FIG. 6 is a schematic top cross-sectional view of the sliding button mounted in its supporting clamp, showing the forces involved.
Figure 7:
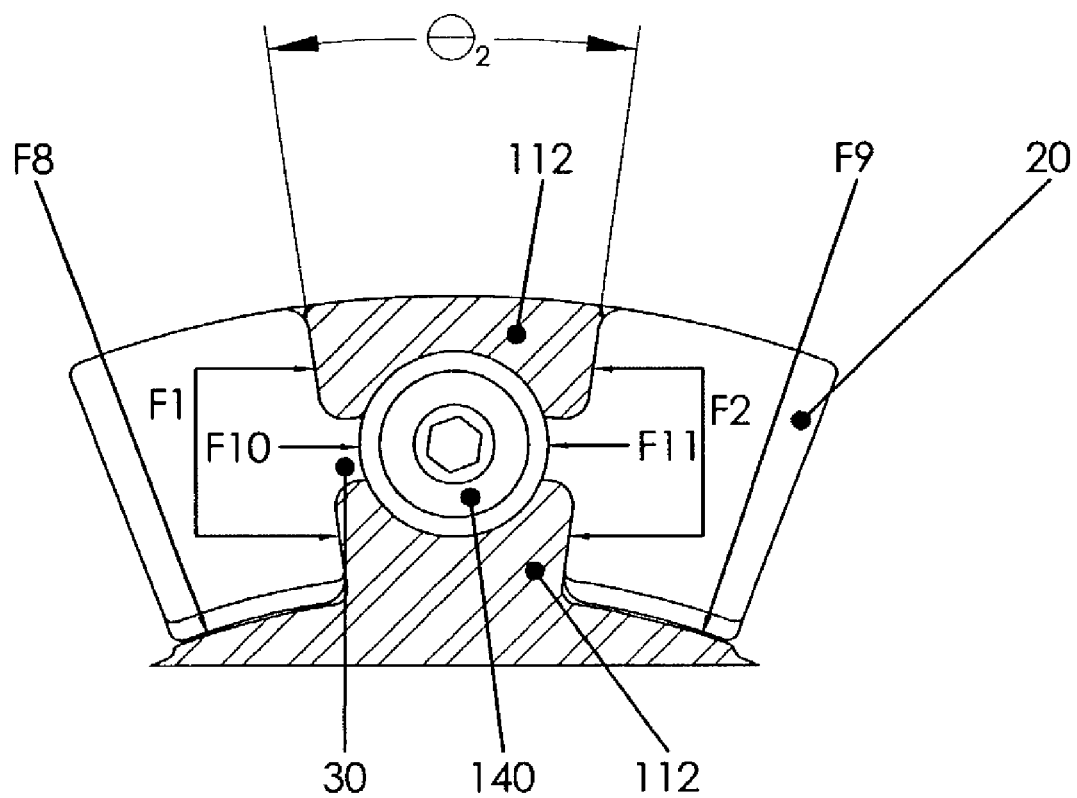
FIG. 7 is a schematic side cross-sectional view similar to that of FIG. 6.

FIGS. 6 and 7 show the forces involved when the sliding button which is installed in the clamp (100). As can be seen, the sides of the central section (110) are preferably slightly inclined and defined between them an angle $\theta_1$. Since the rear sides (24) of the halves (20) are parallel, the insertion of the sliding button (10) into the clamp (100) induces pressing forces on the sides of the central section (110). These forces are referred to as $F_1$ and $F_2$ in FIG. 6. These forces are also shown in FIG. 7. It should be noted that the design should not be such that the sliding button (10) will have a tendency to come out of the clamp (100) by itself. Nevertheless, the screw (140) (shown in FIG. 7) produces a force $F_3$ which maintains the sliding button (10) in place.

As can also be seen in FIG. 6, the two flanges (28), located in the radial slots (130), are designed to apply two opposite forces, referred to as $F_4$ and $F_5$. These forces allow to maintain the bottom side (25) of each half (20) against the side sections (120). Forces $F_6$ and $F_7$ are then applied by the bottom sides (25). All this prevents the half (20) to be lifted from the corresponding side section (120) when the contact surface (26) of the opposite half (20) is engaged against a corresponding ramp (200).

As can be seen from FIG. 7, the sides of the flanges (112) of the central section (110) are separated by an angle $\theta_2$ which is slightly greater than the distance between the two halves (20). This creates forces $F_8$ and $F_9$ which press the inner side of the sliding button (10) against the structure to which the clamp (100) is attached. Such structure can also be seen in FIG. 5. This also promotes stability of the sliding button (10) when it is in use. Among other things, it prevents the inner side of each half (20) from detaching from the adjacent wall under the effect of the elastic forces $F_{10}$ and $F_{11}$ created by the slight stretching of the bridge (30).

FIGS. 8 and 9 schematically show how the sliding button (10) can move while it is in use. During normal use, the contact surface (26) of one sliding button half (20) is in engagement with the corresponding ramp (200). When the direction of the torque changes to the point that this can no longer be compensated by the spring of the driven pulley, the sliding button (10) changes position and is moved towards the opposite ramp (200). This transition period is usually very short. If desired, a damping element (not shown) can be provided between the sliding button (10) and the clamp (100) in order to decrease the shocks caused when the sliding button (10) hits the opposite ramp (200).

As can be appreciated, the double-sided sliding button (10) has many advantages compared to single sliding buttons for reversible driven pulleys. Among other things, the double-sided sliding button (10) can be easily installed and secured in a clamp attached to a part of the driven pulley The number of individual sliding buttons is also reduced by 50%.

What is claimed is:

1. A double-sided sliding button for use in a reversible driven pulley, the sliding button comprising:
   two spaced-apart sliding button halves configured and disposed with reference to a curved medial axis, each half having a front side, provided with a contact surface, a rear side and a bottom side, both contact surfaces being mutually opposite and both front sides intersecting the curved medial axis; and
   a bridge member rigidly connected to the rear side of the two halves.

2. The double-sided sliding button in accordance with claim 1, wherein the bridge member is aligned with the medial axis.

3. The double-sided sliding button in accordance with claim 2, wherein the bridge member comprises a sleeve portion having a center axis extending between to the rear side of the halves.

4. The double-sided sliding button in accordance with claim 1, wherein each half further comprises a flange projecting from the bottom side and extending parallel to the rear side of the half.

5. The double-sided sliding button in accordance with claim 4, wherein the rear side is flat.

6. The double-sided sliding button in accordance with claim 1, wherein the halves and the bridge member are integrally connected in a one-piece molded plastic item.

* * * * *